US010710640B2

(12) United States Patent
Choi et al.

(10) Patent No.: US 10,710,640 B2
(45) Date of Patent: Jul. 14, 2020

(54) SIDE VEHICLE BODY REINFORCING STRUCTURE

(71) Applicants: HYUNDAI MOTOR COMPANY, Seoul (KR); KIA MOTORS CORPORATION, Seoul (KR)

(72) Inventors: Seongeun Choi, Hwaseong-Si (KR); Kun Ho Park, Yongin-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 31 days.

(21) Appl. No.: 16/169,397

(22) Filed: Oct. 24, 2018

(65) Prior Publication Data

US 2019/0193790 A1 Jun. 27, 2019

(30) Foreign Application Priority Data

Dec. 27, 2017 (KR) .......................... 10-2017-0180409

(51) Int. Cl.
*B62D 25/02* (2006.01)
*B62D 21/15* (2006.01)
*B62D 25/20* (2006.01)
*B60R 21/00* (2006.01)
*B62D 29/00* (2006.01)

(52) U.S. Cl.
CPC ......... *B62D 25/025* (2013.01); *B62D 21/157* (2013.01); *B62D 25/2036* (2013.01); *B62D 29/002* (2013.01); *B60R 2021/0006* (2013.01)

(58) Field of Classification Search
CPC .............. B62D 25/025; B62D 25/2036; B62D 21/157; B60R 2021/0006

USPC ............................................. 296/209, 187.12
See application file for complete search history.

(56) References Cited

U.S. PATENT DOCUMENTS

| | | | | |
|---|---|---|---|---|
| 10,513,295 | B2 * | 12/2019 | Takahashi | B62D 25/2036 |
| 10,532,777 | B2 * | 1/2020 | Lee | B62D 25/2036 |
| 2010/0207426 | A1 * | 8/2010 | Tsuruta | B62D 21/157 296/187.12 |
| 2010/0295335 | A1 * | 11/2010 | DeVor | B60N 2/4235 296/187.12 |

(Continued)

FOREIGN PATENT DOCUMENTS

| | | |
|---|---|---|
| JP | 2006-205797 A | 8/2006 |
| KR | 10-2018-0055249 A | 5/2018 |

*Primary Examiner* — Gregory A Blankenship
(74) *Attorney, Agent, or Firm* — Morgan, Lewis & Bockius LLP

(57) ABSTRACT

A side vehicle body reinforcing structure includes: at least two side sills connected to opposite ends of a center floor panel in a width direction of a vehicle body, respectively, and extending in a front and rear direction of the vehicle body, wherein each of the at least two side sills has a tube shape having an interior space therein; a seat cross member having a bottom side connected to the center floor panel and having opposite ends in the width direction of the vehicle body connected to the at least two side sills, respectively, so that the seat cross member crosses the center floor panel in the width direction of the vehicle body; and a center partition spaced apart from an outer plate of each of the at least two side sills to be toward the center floor panel, wherein the center partition has a "U" shape to be convex while being supported by an inner plate of each of the at least two side sills.

29 Claims, 10 Drawing Sheets

(56) References Cited

U.S. PATENT DOCUMENTS

| | | | | |
|---|---|---|---|---|
| 2012/0119546 | A1* | 5/2012 | Honda | B62D 25/025 |
| | | | | 296/203.01 |
| 2013/0200650 | A1* | 8/2013 | Matsuoka | B62D 21/155 |
| | | | | 296/187.1 |
| 2014/0152053 | A1* | 6/2014 | Watanabe | B62D 25/02 |
| | | | | 296/193.06 |
| 2014/0327268 | A1* | 11/2014 | Mori | B62D 21/157 |
| | | | | 296/187.08 |
| 2015/0258956 | A1* | 9/2015 | Sassi | B60R 21/0136 |
| | | | | 701/45 |
| 2016/0229456 | A1* | 8/2016 | Boettcher | B62D 25/025 |
| 2016/0325785 | A1* | 11/2016 | Nakagawa | B62D 25/025 |
| 2017/0036701 | A1* | 2/2017 | Yamada | B62D 29/002 |
| 2017/0036705 | A1* | 2/2017 | Muramatsu | B62D 25/2027 |
| 2017/0050675 | A1* | 2/2017 | Kellner | B62D 25/025 |
| 2017/0297628 | A1* | 10/2017 | Iyoshi | B62D 25/04 |
| 2018/0237075 | A1* | 8/2018 | Kawabe | B62D 21/157 |
| 2019/0009832 | A1* | 1/2019 | Kageyama | B60N 2/015 |
| 2019/0193790 | A1* | 6/2019 | Choi | B62D 25/2036 |
| 2019/0283805 | A1* | 9/2019 | Kurokawa | B62D 29/005 |
| 2019/0359048 | A1* | 11/2019 | Tsuyuzaki | B60K 1/04 |
| 2019/0359260 | A1* | 11/2019 | Tsuyuzaki | B62D 21/157 |

\* cited by examiner

SIDE VEHICLE BODY REINFORCING STRUCTURE

CROSS-REFERENCE TO RELATED APPLICATION

This application claims priority to and the benefit of Korean Patent Application No. 10-2017-0180409 filed in the Korean Intellectual Property Office on Dec. 27, 2017, the entire contents of which are incorporated herein by reference.

TECHNICAL FIELD

The present disclosure relates to a side vehicle body reinforcing structure, and more particularly, to a side vehicle body reinforcing structure capable of bettering performance against a collision of a side vehicle body.

BACKGROUND

Generally, a vehicle a front side member at a front side extending in a front and rear direction of a vehicle body at both sides in a width direction of the vehicle body such that structural strength of the front vehicle body can be reinforced.

The vehicle further includes a floor panel forming a bottom surface of the vehicle body and including a front floor panel, a center floor panel, and a rear floor panel from the front side of the vehicle in the front and rear direction. Herein, the front floor panel is included at a bottom surface of an engine compartment, the center floor panel is included at a bottom surface of a passenger compartment, and the rear floor panel is included at a bottom surface of a luggage compartment.

In addition, a side sill, which is extended in the front and rear direction of the vehicle body and is respectively disposed at both sides in the width direction of the vehicle body, is connected with a rear end of the front side member. The side sill is coupled to the center floor panel at both sides in the width direction of the vehicle body so as to function to cope with a side collision of the vehicle.

However, it may excessively increase a production cost for a composition of a side vehicle body including the side sill to be complex for bettering performance against a collision of the side vehicle body. In addition, it may be difficult to ensure rigidity of the side vehicle body by using a simple composition.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a side vehicle body reinforcing structure having advantages of ensuring rigidity and simultaneously reducing a production cost.

A side vehicle body reinforcing structure according to an exemplary embodiment of the present disclosure may include: at least two side sills combined to opposite ends of a center floor panel in a width direction of a vehicle body, respectively, and extending in a front and rear direction of the vehicle body, wherein each of the at least two side sills has a tube shape having an interior space of a box shape; a seat cross member having a bottom side connected to the center floor panel and having opposite ends in the width direction of the vehicle body connected to the at least two side sills, respectively, so that the seat cross member crosses the center floor panel in the width direction of the vehicle body; and a center partition spaced apart from an outer plate of each of the at least two side sills to be toward the center floor panel, wherein the center partition has a "U" shape to be convex while being supported by an inner plate of each of the at least two side sills.

The seat cross members may be arranged in plural along a front and rear direction of the vehicle body.

The side vehicle body reinforcing structure according to an exemplary embodiment of the present disclosure may further include an outer partition spaced apart from the outer plate of the side sill toward the inside and to be positioned apart from the center partition toward the outside in the interior space and adapted to connect an upper plate of the side sill with a lower plate of the side sill.

The outer partition may be extended from a front end of the side sill to a rear end of the side sill.

The outer partition may include: a pair of contacting portions contacting the respective lower end of the upper plate of the side sill and upper end of the lower plate of the side sill; a pair of vertically extended portions bent from the respective pair of contacting portions and respectively extended upwardly and downwardly; a pair of horizontally extended portions bent from the respective the pair of vertically extended portions and extended toward the outside in a width direction of the vehicle body; and a connecting portion connecting the pair of horizontally extended portions.

The center partition may be extended from a front end of the side sill to a rear end of the side sill.

The center partition may include; a pair of contacting portions contacting the inner plate of the side sill; a pair of horizontally extended portions bent from the respective pair of contacting portions and extended toward the outside in a width direction of the vehicle body; and a connecting portion connecting the pair of horizontally extended portions.

The horizontally extended portion may be extended over half of a width of the side sill.

The pair of horizontally extended portions may be formed to be gradually closer to each other toward the outside.

The "U" shape of the center partition may be formed to be convex over half of a width of the side sill.

Foam may be filled into a space formed between the outer plate of the side sill and the outer partition among three spaces formed by partitioning the interior space by the outer partition and the center partition.

Foam may be filled into at least one among three spaces formed by partitioning the interior space by the outer partition and the center partition.

Foam may be respectively filled into a space formed between the outer plate of the side sill and the outer partition and a space formed between the inner plate of the side sill and the center partition among three spaces formed by partitioning the interior space by the outer partition and the center partition.

The outer partition may include a portion which is formed in a "U" shape to be convex toward the outside.

A first section of absorbing load for firstly absorbing a load depending on a collision of a side vehicle body may be formed from the outer plate of the side sill to the outer partition.

A second section of absorbing load for secondly absorbing a load depending on a collision of a side vehicle body transferred via the first section of absorbing load may be formed from the center partition to the inner plate of the side sill.

The center floor panel and the seat cross member may thirdly absorb a load depending on a collision of a side vehicle body that is transferred via the second section of absorbing load.

The side vehicle body reinforcing structure according to an exemplary embodiment of the present disclosure may further include an inner partition spaced apart from the inner plate of the side sill toward the outside in the interior space and adapted to connect an upper plate of the side sill with a lower plate of the side sill.

Foam may be filled into a space formed between the inner plate of the side sill and the inner partition, and the center partition may be supported by the inner plate of the side sill by being supported by the inner partition.

The inner partition may be extended from a front end of the side sill to a rear end of the side sill.

The inner partition may include: a pair of contacting portions respectively contacting a lower end of the upper plate of the side sill and an upper end of the lower plate of the side sill; a pair of vertically extended portions bent from the respective pair of contacting portions and respectively extended upwardly and downwardly; a pair of horizontally extended portions bent from the respective pair of vertically extended portions and extended toward the outside in a width direction of the vehicle body; and a connecting portion connecting the pair of horizontally extended portions.

The side vehicle body reinforcing structure according to an exemplary embodiment of the present disclosure further include an outer partition spaced apart from the outer plate of the side sill toward the inside and to be positioned apart from the center partition toward the outside in the interior space and adapted to connect the upper plate of the side sill with the lower plate of the side sill.

Foam may be filled into a space formed between the outer plate of the side sill and the outer partition among four spaces formed by partitioning the interior space by the outer partition, the center partition, and the inner partition too.

Foam may be filled into at least two spaces including a space formed between the inner plate of the side sill and the inner partition among four spaces formed by partitioning the interior space by the outer partition, the center partition, and the inner partition.

The seat cross member may have a section formed in a "U" shape to be upwardly convex.

Foam may be filled into a space surrounded by the seat cross member and the center floor panel.

The side vehicle body reinforcing structure according to an exemplary embodiment of the present disclosure may further include a reinforcing portion disposed between the seat cross member and the center floor panel, adapted so that a lower end thereof is connected with a lower end of the seat cross member and is combined to the center floor panel, and adapted to have a section of a "U" shape to be upwardly convex.

Foam may be filled into at least one among a space surrounded by the reinforcing portion and the seat cross member and a space surrounded by the reinforcing portion and the center floor panel.

The reinforcing portion may be extended from one end of the seat cross member to the other end the seat cross member in a width direction of the vehicle body.

The reinforcing portion may be spaced apart from the seat cross member and foam may be filled into a space surrounded by the reinforcing portion and the seat cross member.

The reinforcing portion may be disposed so that an upper end thereof is contacts the seat cross member and foam may be filled into a space surrounded by the reinforcing portion and the center floor panel.

DETAILED DESCRIPTION OF THE EMBODIMENTS

An exemplary embodiment of the present disclosure will hereinafter be described in detail with reference to the accompanying drawings.

Figure 1:
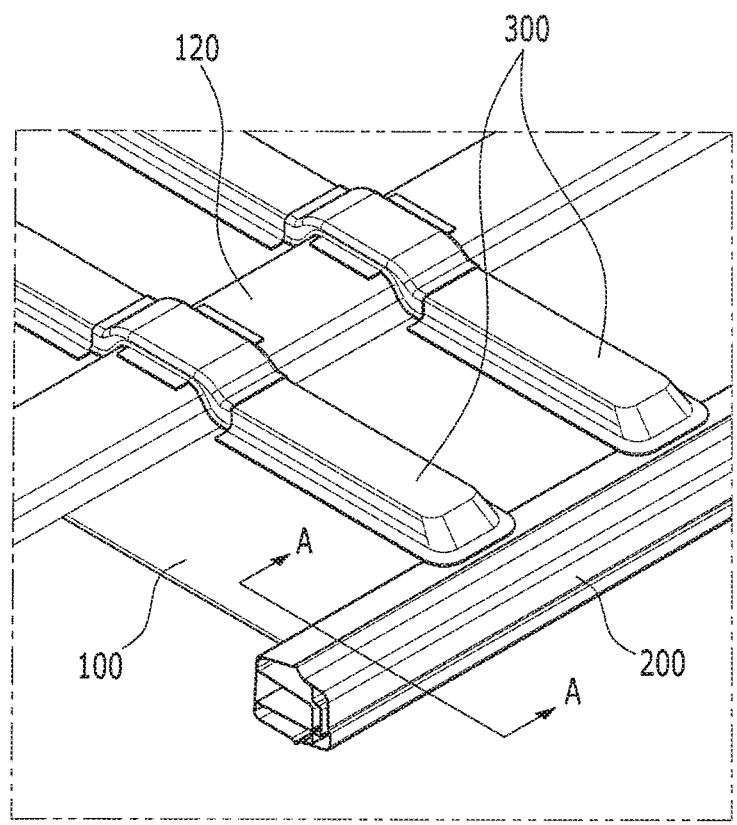
FIG. 1 is a perspective view of a side vehicle body reinforcing structure according to an exemplary embodiment of the present disclosure.

FIG. 1 is a perspective view of a side vehicle body reinforcing structure according to an exemplary embodiment of the present disclosure.

As shown in FIG. 1, a side vehicle body reinforcing structure according to an exemplary embodiment of the present disclosure includes a side sill 200 and a seat cross member 300.

The side sills 200 are respectively combined to both sides of a center floor panel 100 in a width direction of a vehicle body. In addition, the side sill 200 is connected with a rear end of a front side member (not shown) and is extended backwardly in a front and rear direction of the vehicle body. Herein, the center floor panel 100 and the front side member are well known to a person of ordinary skill in the art, so detailed descriptions thereof will be omitted. In this specification, directions of upper, lower, front, and rear mean upper, lower, front, and rear directions of an ordinary vehicle, and outside and inside mean relatively outside and inside with respect to a width direction of an ordinary vehicle.

The seat cross member 300 is arranged to cross the center floor panel 100 in a width direction of the vehicle body. In addition, the seat cross member 300 is configured so that a lower end thereof is combined to the center floor panel 100 and both ends thereof are respectively combined to the side sill 200 in a width direction of the vehicle body. This combination may be realized as a flange 305 which is formed at a circumference of the seat cross member 300 is welded to the center floor panel 100 and the side sill 200. Meanwhile, for a vehicle which is configured so that a propeller shaft passes in a front and rear direction of a vehicle such as a vehicle which is configured so that an engine is mounted to a front vehicle body and a rear wheel is a driving wheel, a tunnel 120 is formed at or provided to the center floor panel such that the propeller shaft is arranged therein. In this regard, the seat cross member 300 may be composed as a pair of which one is arranged to connect one end of the tunnel 120 in a width direction of the vehicle body with the side sill 200 positioned at one side in a width direction of the vehicle body and another one which is arranged to connect the other end of the tunnel 120 in a width direction of a vehicle body with the side sill 200 positioned at the other side in a width direction of the vehicle body. Further, a plurality of the seat cross members 300 may be arranged in a front and rear direction of the vehicle body. Herein, the tunnel 120 is well known to a person of an ordinary skill in the art, so a detailed description thereof will be omitted.

Hereinafter, a composition and a function of the side sill 200 will be described in detail referring to FIG. 2 to FIG. 7 shown along the line A-A in FIG. 1.

Figure 2:
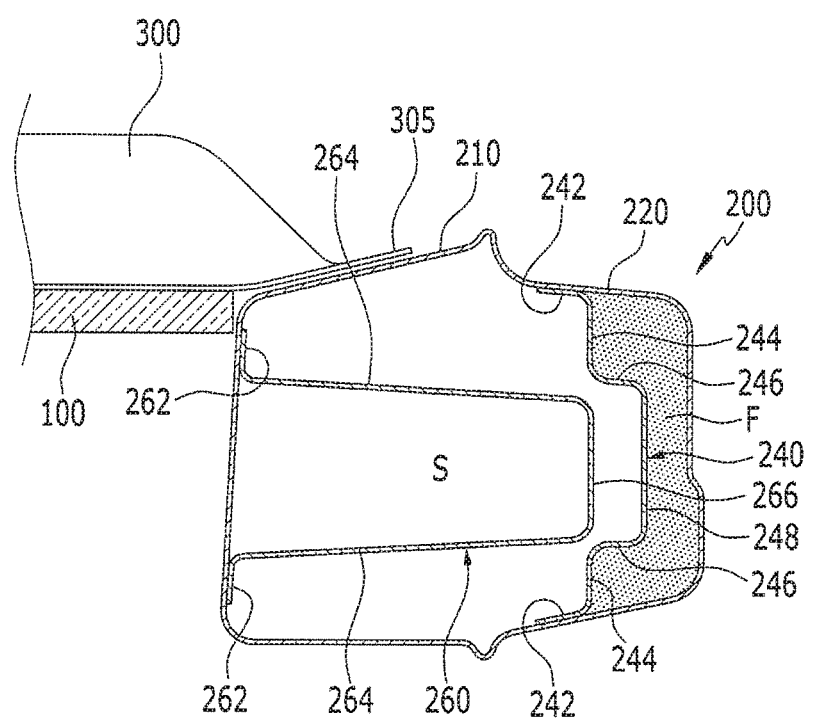
FIG. 2 is a drawing for showing an inside composition of a side sill in a side vehicle body reinforcing structure according to an exemplary embodiment of the present disclosure.

FIG. 2 is a drawing for showing an inside composition of a side sill in a side vehicle body reinforcing structure according to an exemplary embodiment of the present disclosure.

As shown in FIG. 2, the side sill 200 includes an inner panel 210, an outer panel 220, an outer partition 240, and a center partition 260.

The side sill 200 forms a closed section with a box shape having an interior space S which is surrounded by an outer plate, an inner plate, an upper plate, and a lower plate by coupling the inner panel 210 which is disposed at a relative inside in a width direction of the vehicle body and the outer panel 220 which is disposed at a relative outside in a width direction of the vehicle body. In addition, the outer partition 240 and the center partition 260 are disposed in the interior space S.

The outer partition 240 is spaced apart from the outer plate of the side sill 200 toward the inside and is extended from a front end of the side sill 200 to a rear end of the side sill 200. In addition, the outer partition 240 includes a first contacting portion 242, a first vertically extended portion 244, a first horizontally extended portion 246, and a first connecting portion 248.

The first contacting portion 242 of the outer partition 240 is composed as a pair of one which contacts a lower end of the upper plate of the side sill 200 and the other one which contacts an upper end of the lower plate of the side sill 200.

The first vertically extended portion 244 of the outer partition 240 is composed as a pair so as to have a shape of being respectively bent from the pair of first contacting portions 242 and then being respectively extended upwardly and downwardly.

The first horizontally extended portion 246 of the outer partition 240 is composed as a pair so as to have a shape of being respectively bent from the pair of first vertically extended portions 244 and then being respectively extended toward the outside in a width direction of the vehicle body.

The first connecting portion 248 of the outer partition 240 is formed to connect the pair of first horizontally extended portions 246.

The center partition 260 is spaced apart from the outer partition 240 toward the inside and is extended from a front end of the side sill 200 to a rear end of the side sill 200. In addition, the center partition 260 includes a second contacting portion 262, a second horizontally extended portion 264, and a second connecting portion 266.

The second contacting portion 262 of the center partition 260 is composed as a pair which is respectively contacts the inner plate of the side sill 200.

The second horizontally extended portion 264 of the center partition 260 is composed as a pair so as to have a shape of being respectively bent from the pair of second contacting portions 262 and being respectively extended toward the outside in a width direction of the vehicle body. In addition, the second horizontally extended portion 264 of the center partition 260 is extended over a half of a width of the side sill 200. The longer the second horizontally extended portion 264 of the center partition 260 is, the more improved performance against a collision of a side vehicle body may become. Further, the pair of second horizontally extended portions 264 are formed to be gradually closer to each other toward the outside.

The second connecting portion 266 of the center partition 260 is formed to connect the pair of second horizontally extended portions 264. In addition, the second connecting portion 266 of the center partition 260 may be disposed to be close to the pair of first vertically extended portions 244 of the outer partition 240 or to be positioned on a same plane in a width direction of the vehicle body.

According to the above description, the outer partition 240 and the center partition 260 respectively have a section formed in a "U" shape by the first and second horizontally extended portions 246 and 264 and the first and second connecting portions 248 and 266. In addition, the interior space S of the side sill 200 is partitioned to three spaces by the outer partition 240 and the center partition 260. In a space formed between the outer plate of the side sill 200 and the outer partition 240, foam F is filled such that strength is to be high. Further, as the pair of second horizontally extended portions 264 become gradually closer to each other toward the outside, buckling of the "U" shape is prevented.

Figure 3:
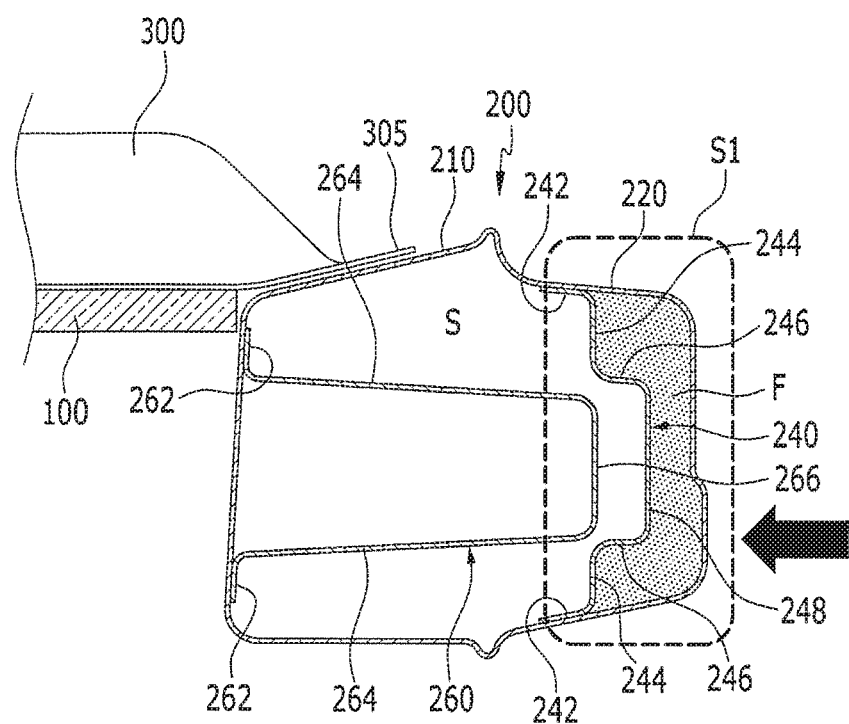
FIG. 3 is a drawing for showing a first section of absorbing a load in a side vehicle body reinforcing structure according to an exemplary embodiment of the present disclosure.

FIG. 3 is a drawing for showing a first section of absorbing a load in a side vehicle body reinforcing structure according to an exemplary embodiment of the present disclosure.

Figure 4:
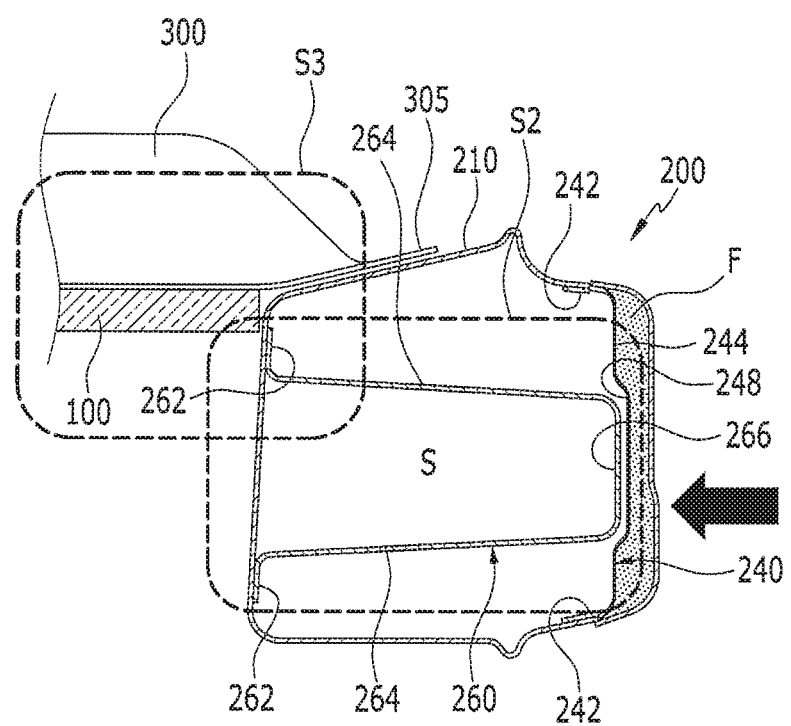
FIG. 4 is a drawing for showing a second section of absorbing a load and a third section of absorbing a load in a side vehicle body reinforcing structure according to an exemplary embodiment of the present disclosure.

As shown in FIG. 3, the outer plate of the side sill 200, the foam F filled between the outer plate of the side sill 200 and the outer partition 240, and the outer partition 240 form a first section S1 of absorbing load. In FIG. 3 and FIG. 4, a direction of receiving a load caused by a collision of a side vehicle body is illustrated by an arrow.

The first section S1 of absorbing load firstly absorbs a load caused by a collision of a side vehicle body. That is, when the outer plate of the side sill 200 directly receives a load caused by a collision of a side vehicle body, the foam F and the outer partition 240 firstly absorb the load together. At this time, the outer plate of the side sill 200, the foam F, and the outer partition 240 are transformed, thereby absorbing the load if a load caused by a collision of a side vehicle body is bigger than a breaking stress of the outer plate of the side sill 200, the foam F, and the outer partition 240.

FIG. 4 is a drawing for showing a second section of absorbing a load and a third section of absorbing a load in a side vehicle body reinforcing structure according to an exemplary embodiment of the present disclosure.

As shown in FIG. 4, the center partition 260 and the inner plate of the side sill 200 form a second section S2 of absorbing load, and the center floor panel 100 and the seat cross member 300 form a third section S3 of absorbing load.

The second section S2 of absorbing load secondly absorbs a load by a collision of a side vehicle body. That is, when the second connecting portion 266 of the center partition 260 receives a load caused by a collision of a side vehicle body as the first section S1 of absorbing load gives way, the pair of second horizontally extended portions 264 of the center partition 260 and the inner plate of the side sill 200 secondly absorb the load together. At this time, the center partition 260 and the inner plate of the side sill 200 may be transformed, thereby absorbing the load if a load caused by a collision of a side vehicle body is to be bigger than a breaking stress of the center partition 260 and the side sill 200.

The third section S3 of absorbing load thirdly absorbs a load caused by a collision of a side vehicle body. That is, the center floor panel 100 and the seat cross member 300 naturally receive a load from the inner panel 210 of the side sill 200 and then absorb and disperse the load in a case that the first section S1 of absorbing load and the second section S2 of absorbing load give way, and further, the center floor panel 100 and the seat cross member 300 receive and then absorb and disperse the load too even if the first section S1 of absorbing load and the second section S2 of absorbing load do not give way.

Figure 5:
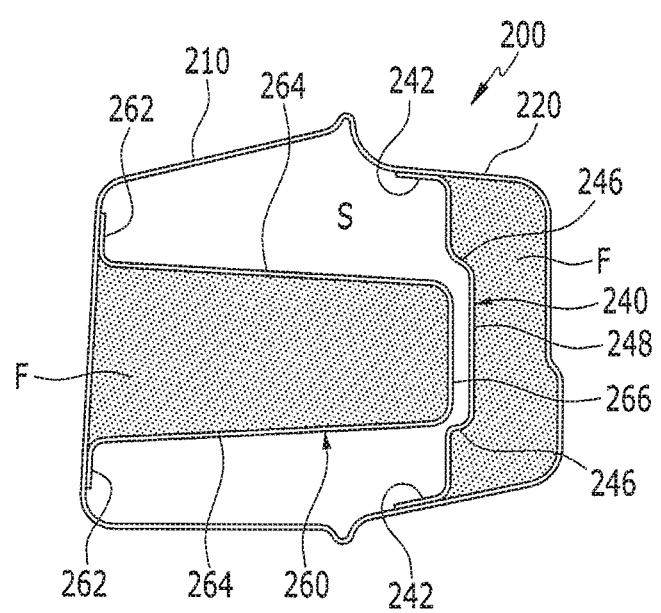
FIG. 5 is a drawing for showing an exemplary variation of a side sill in a side vehicle body reinforcing structure according to an exemplary embodiment of the present disclosure.

FIG. 5 is a drawing for showing an exemplary variation of a side sill in a side vehicle body reinforcing structure according to an exemplary embodiment of the present disclosure.

As shown in FIG. 5, foam F for increasing strength may be filled in a space formed between the center partition 260 and the inner plate of the side sill 200 too. The foam F may be filled into the space between the outer plate of the side sill 200 and the outer partition 240 and the space between the center partition 260 and the inner plate of the side sill 200, and naturally, foam F may also be filled into at least one of the three spaces formed as the interior space S is partitioned by the outer partition 240 and the center partition 260 depending on design by a person of an ordinary skill in the art.

Figure 6:
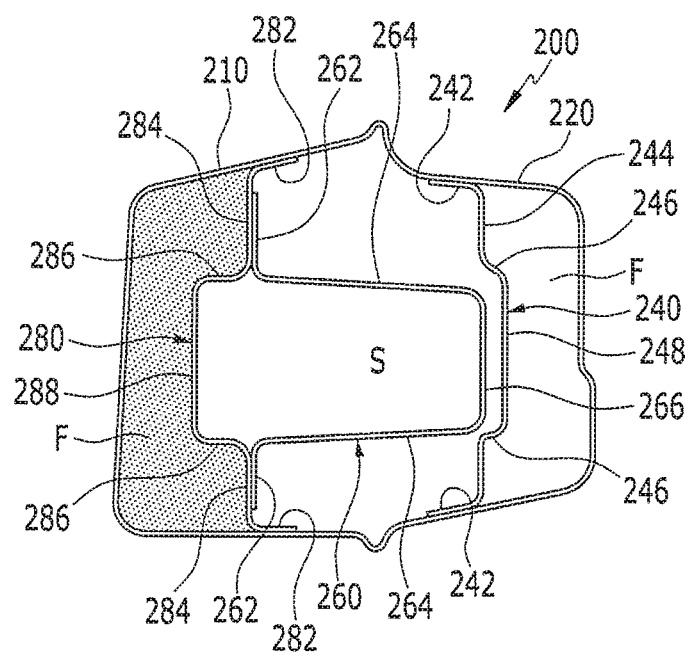
FIG. 6 is a drawing for showing an inside composition of a side sill in a side vehicle body reinforcing structure according to another exemplary embodiment of the present disclosure.

FIG. 6 is a drawing for showing an inside composition of a side sill in a side vehicle body reinforcing structure according to another exemplary embodiment of the present disclosure.

As shown in FIG. 6, a side vehicle body reinforcing structure according to another exemplary embodiment of the present disclosure further includes an inner partition 280 and varies a part to which the pair of second contacting portion 262 of the center partition 260 are contacted in comparison with the exemplary embodiment described referring to FIG. 2 to FIG. 5.

The inner partition 280 is disposed in the interior space S. In addition, the inner partition 280 is spaced apart from the inner plate of the side sill 200 toward the inside and is extended from a front end of the side sill 200 to a rear end of the side sill 200. The inner partition 280 includes a third contacting portion 282, a second vertically extended portion 284, a third horizontally extended portion 286, and a third connecting portion 288.

The third contacting portion 282 of the inner partition 280 is composed as a pair of one which contacts a lower end of the upper plate of the side sill 200 and the other one which contacts an upper end of the lower plate of the side sill 200.

The second vertically extended portion 284 of the inner partition 280 is composed as a pair so as to have a shape of being respectively bent from the pair of third contacting portions 282 and then being respectively extended upwardly and downwardly.

The third horizontally extended portion 286 of the inner partition 280 is composed as a pair so as to have a shape of being respectively bent from the pair of second vertically extended portions 284 and then being respectively extended toward the inside in a width direction of the vehicle body.

The third connecting portion 288 of the inner partition 280 is formed to connect the pair of third horizontally extended portions 286.

In this regard, the pair of second contacting portions 262 of the center partition 260 are varied to respectively contact not with the inner plate of the side sill 200 but the pair of second vertically extended portion 284 of the inner partition 280 in comparison with the exemplary embodiment described referring to FIG. 2 to FIG. 5. Thus, a closed section, which is surrounded by the second horizontally extended portion 264 of the center partition 260, the second connecting portion 266 of the center partition 260, the pair of third horizontally extended portions 286 of the inner partition 280, and the third connecting portion 288 of the inner partition 280, is formed in a box shape. In addition, the interior space S of the side sill 200 is partitioned to four spaces by the outer partition 240, the center partition 260, and the inner partition 280. Further, foam F is filled in a space formed between the inner plate of the side sill 200 and the inner partition 280 such that strength is to be high.

According to the above description, the inner partition 280 has a section formed in a "U" shape by the pair of third horizontally extended portions 286 and the third connecting portion 288. In addition, the second section S2 of absorbing load is further reinforced in comparison with the exemplary embodiment described referring to FIG. 2 to FIG. 5.

The foam F can be filled into the space between the outer plate of the side sill 200 and the outer partition 240 and the space between the inner plate of the side sill 200 and the inner partition 280, and foam F may also be filled into at least two of the four spaces formed as the interior space S is partitioned by the outer partition 240, the center partition 260, and the inner partition 280 depending on design by a person of ordinary skill in the art.

Figure 7:
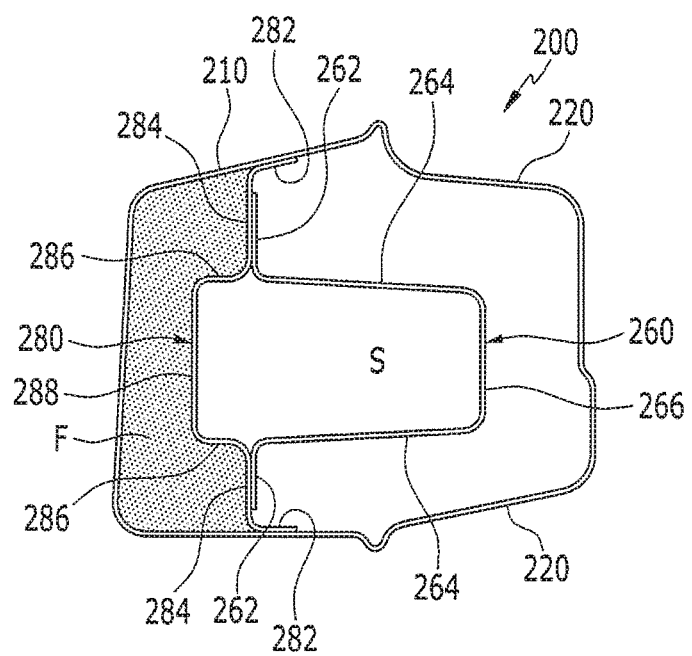
FIG. 7 is a drawing for showing an exemplary variation of a side sill in a side vehicle body reinforcing structure according to another exemplary embodiment of the present disclosure.

FIG. 7 is a drawing for showing an exemplary variation of a side sill in a side vehicle body reinforcing structure according to another exemplary embodiment of the present disclosure.

As shown in FIG. 7, an exemplary variation of the side sill 200 in a side vehicle body reinforcing structure according to another exemplary embodiment of the present disclosure does not have the foam F filled between the outer plate of the side sill 200 and the outer partition 240 and the outer partition 240 in comparison with the exemplary embodiment described referring to FIG. 6. Therefore, the production process steps can be decreased and the production cost can be reduced in comparison with the exemplary embodiment described referring to FIG. 6. Further, overall strength of the structure for absorbing a load by transformation may be ensured as the second section S2 of absorbing load is further reinforced even though strength of the first section S1 of absorbing load is deteriorated.

Figure 8:
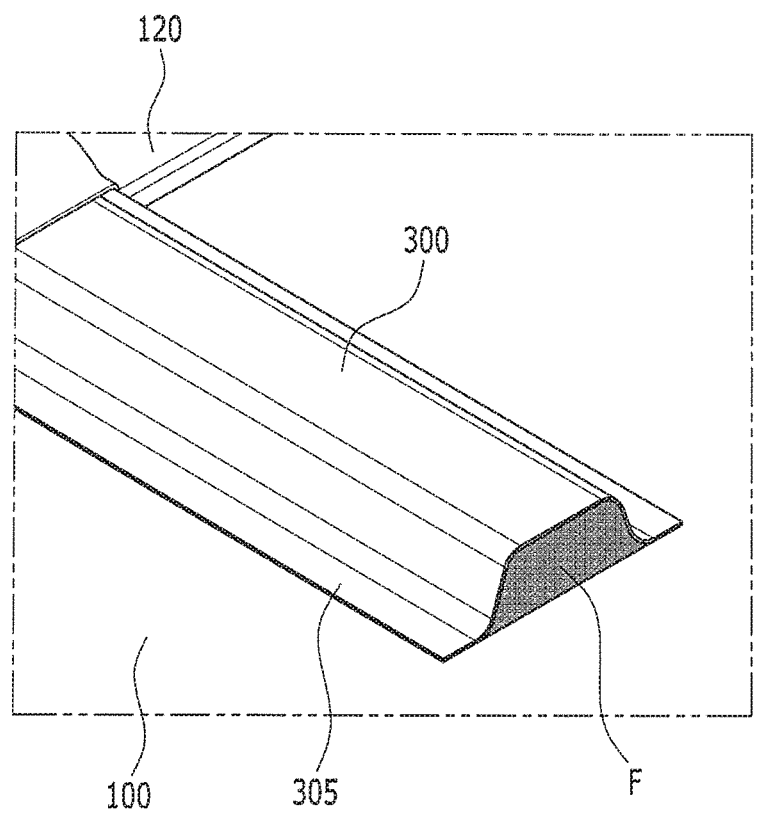
FIG. 8 is a drawing for showing an inside composition of a seat cross member in a side vehicle body reinforcing structure according to an exemplary embodiment of the present disclosure.

FIG. 8 is a drawing for showing an inside composition of a seat cross member in a side vehicle body reinforcing structure according to an exemplary embodiment of the present disclosure.

As shown in FIG. 8, the seat cross member 300 has a section formed in a "U" shape to be upwardly convex when shown in a width direction of the vehicle body. In other words, a closed section, which is surrounded by the seat cross member 300 and the center floor panel 100, is formed in a box shape. That is, a space is formed between the seat cross member 300 and the center floor panel 100, and foam F is filled in this space. Thus, strength of the seat cross member 300 composing the third section S3 of absorbing load so as to receive a load from the side sill 200 is ensured.

Figure 9:
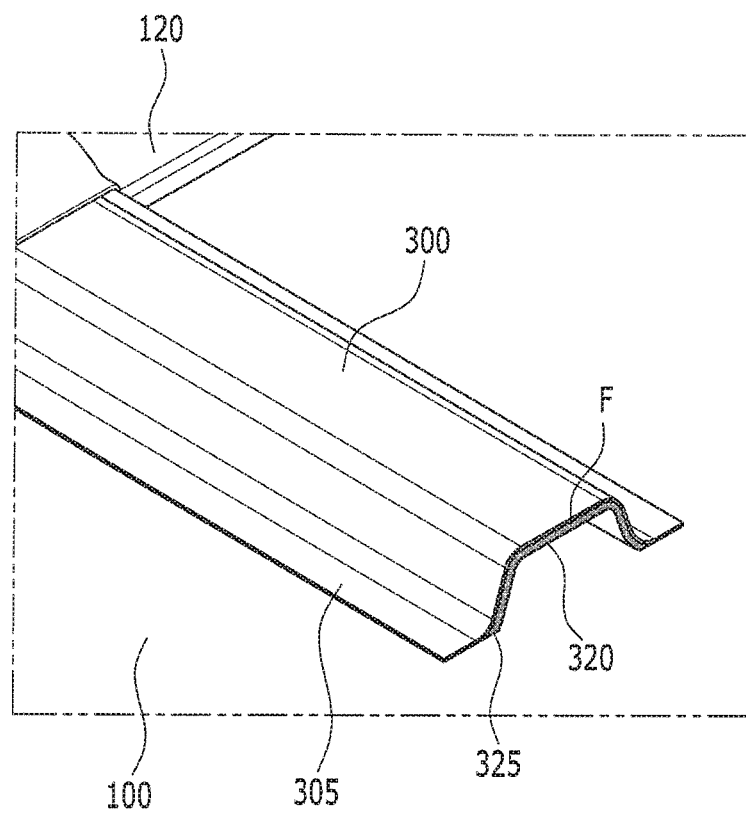
FIG. 9 is a drawing for showing an exemplary variation of a seat cross member in a side vehicle body reinforcing structure according to an exemplary embodiment of the present disclosure.

FIG. 9 is a drawing for showing an exemplary variation of a seat cross member in a side vehicle body reinforcing structure according to an exemplary embodiment of the present disclosure.

As shown in FIG. 9, an exemplary variation of the seat cross member 300 further includes a reinforcing portion 320 and varies spaces for filling foam F in comparison with the exemplary embodiment described referring to FIG. 8.

The reinforcing portion 320 is spaced apart from the seat cross member 300 between the seat cross member 300 and the center floor panel 100. In addition, the reinforcing portion 320 is configured so that a lower end thereof is combined to the center floor panel 100. This combination may be realized by a flange 325 which is formed at a circumference of the reinforcing portion 320 and is welded to the center floor panel 100. The flange 325 of the reinforcing portion 320 is connected with the flange 305 of the seat cross member 300. In addition, the reinforcing portion 320 is extended from one end of the seat cross member 300 to the other end of the seat cross member 300 in a width direction of the vehicle body. Further, the reinforcing portion 320 has a section formed in a "U" shape to be upwardly convex when shown in a width direction of the vehicle body. In other words, a closed section, which is surrounded by the reinforcing portion 320 and the center floor panel 100, is formed in a box shape, and a closed section, which is surrounded by the reinforcing portion 320 and the seat cross member 300, is formed. That is, a space is formed between the seat cross member 300 and the reinforcing portion 320, and foam F is filled in this space. Thus, the third section S3 of absorbing load is further reinforced in comparison with the exemplary embodiment described referring to FIG. 8. Herein, the foam F is filled into the space between the seat cross member 300 and the reinforcing portion 320, and the foam F may be filled into at least one of the spaces between the seat cross member 300 and the reinforcing portion 320 and the space between the reinforcing portion 320 and the center floor panel 100 depending on design by a person of ordinary skill in the art.

Figure 10:
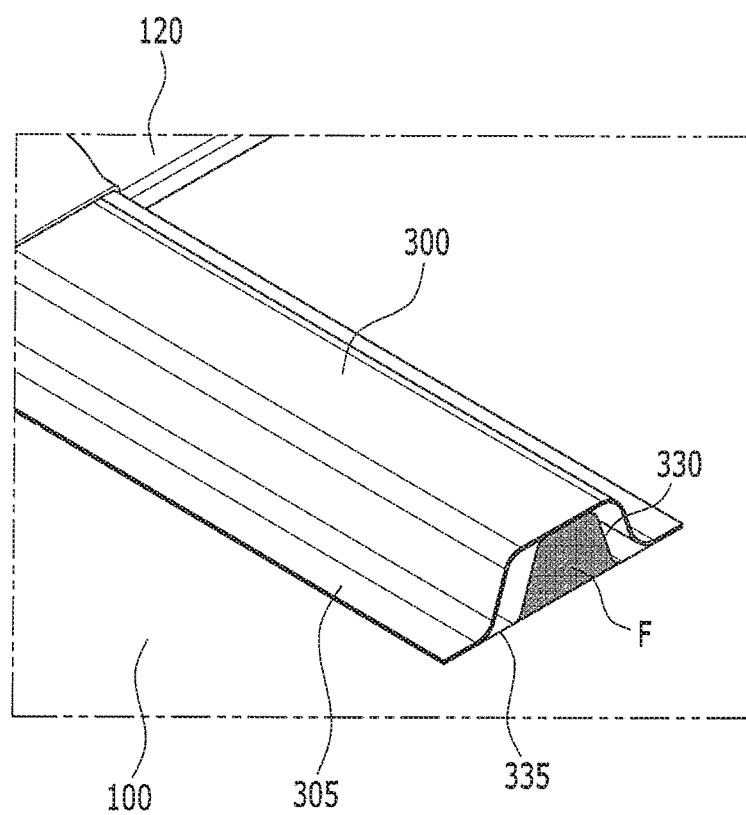
FIG. 10 is a drawing for showing another exemplary variation of a seat cross member in a side vehicle body reinforcing structure according to an exemplary embodiment of the present disclosure.

FIG. 10 is a drawing for showing another exemplary variation of a seat cross member in a side vehicle body reinforcing structure according to an exemplary embodiment of the present disclosure.

As shown in FIG. 10, the present exemplary variation of the seat cross member 300 is changed such that a varied reinforcing portion 330 is further included and spaces for filling foam F are varied in comparison with the exemplary embodiment described referring to FIG. 8.

The varied reinforcing portion 330 is disposed such that an upper end thereof contacts the seat cross member 300 between the seat cross member 300 and the center floor panel 100. In addition, the varied reinforcing portion 330 is configured so that a lower end thereof is combined to the center floor panel 100. This combination may be realized by a flange 335 which is formed at a circumference of the varied reinforcing portion 330 and is welded to the center floor panel 100. The flange 335 of the varied reinforcing portion 330 is connected with the flange 305 of the seat cross member 300. In addition, the varied reinforcing portion 330 is extended from one end of the seat cross member 300 to the other end of the seat cross member 300 in a width direction of the vehicle body. Further, the varied reinforcing portion 330 has a section formed in a "U" shape to be upwardly convex when shown in a width direction of the vehicle body. In other words, a closed section, which is surrounded by the varied reinforcing portion 330 and the center floor panel 100, is formed in a box shape, and two closed sections, which are surrounded by the varied reinforcing portion 330 and the seat cross member 300, are formed. That is, a space is formed between the center floor panel 100 and the varied reinforcing portion 330, and foam F is filled in this space. Thus, the third section S3 of absorbing load is further reinforced in comparison with the exemplary embodiment described referring to FIG. 8. Meanwhile, it is desirable for the foam F to be filled into the space between the center floor panel 100 and the varied reinforcing portion 330, but the foam F may be filled into at least one of the two spaces between the center floor panel 100 and the varied reinforcing portion 330 and the space between the varied reinforcing portion 330 and the seat cross member 300 depending on design by a person of ordinary skill in the art.

According to an exemplary embodiment of the present disclosure, strength can be ensured as the partition (240, 260, and 280) and the foam F are applied to the side sill 200. In addition, the production process steps may be decreased and the production cost may be reduced by the simple composition capable of ensuring strength. Further, even if a load that is larger than a breaking stress of the side sill 200 which is composed of the partition (240, 260, and 280) and the foam F is applied, performance against a collision of a side vehicle body can be maximized as the side sill 200 absorbs the load by transformation via at least three steps.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A side vehicle body reinforcing structure comprising:
   at least two side sills connected to opposite ends of a center floor panel in a width direction of a vehicle body, respectively, and extending in a front and rear direction of the vehicle body, wherein each of the at least two side sills has a tube shape having an interior space therein;
   a seat cross member having a bottom side connected to the center floor panel and having opposite ends in the width direction of the vehicle body connected to the at least two side sills, respectively, so that the seat cross member crosses the center floor panel in the width direction of the vehicle body;

a center partition spaced apart from an outer plate of each of the at least two side sills to be toward the center floor panel, wherein the center partition has a "U" shape to be convex while being supported by an inner plate of each of the at least two side sills; and an outer partition spaced apart from the outer plate of each of the at least two side sills toward the center floor panel and spaced apart from the center partition toward the outer plate inside each of the at least two side sills, wherein the outer partition connects an upper plate of each of the at least two side sills with a lower plate of each of the at least two side sills.

2. The side vehicle body reinforcing structure of claim 1, wherein the seat cross member is provided in plural and spaced apart from each other along the front and rear direction of the vehicle body.

3. The side vehicle body reinforcing structure of claim 1, wherein the outer partition extends from a front end of each of the at least two side sills to a rear end of each of the at least two side sills.

4. The side vehicle body reinforcing structure of claim 1, wherein the outer partition comprises:
   a pair of first contacting portions contacting a bottom side of the upper plate of each of the at least two side sills and a top side of the lower plate of each of the at least two side sills;
   a pair of first vertically extended portions bent from the respective pair of first contacting portions and respectively extending upwardly and downwardly;
   a pair of first horizontally extended portions bent from the respective the pair of first vertically extended portions and extending toward the outside in the width direction of the vehicle body; and
   a first connecting portion connecting the pair of first horizontally extended portions.

5. The side vehicle body reinforcing structure of claim 1, wherein the center partition extends from a front end of each of the at least two side sills to a rear end of each of the at least two side sills.

6. The side vehicle body reinforcing structure of claim 1, wherein the center partition comprises:
   a pair of second contacting portions contacting the inner plate of each of the at least two side sills;
   a pair of second horizontally extended portions bent from the respective pair of second contacting portions and extending toward the outside in the width direction of the vehicle body; and
   a second connecting portion connecting the pair of second horizontally extended portions.

7. The side vehicle body reinforcing structure of claim 6, wherein each of the pair of second horizontally extended portion extends over a half of a width of each of the at least two side sills.

8. The side vehicle body reinforcing structure of claim 6, wherein the pair of second horizontally extended portions obliquely extend toward the outer plate of each of the at least two side sills to be gradually closer to each other toward the outer plate of each of the at least two side sills.

9. The side vehicle body reinforcing structure of claim 1, wherein the "U" shape of the center partition is convex over half of a width of each of the at least two side sills.

10. The side vehicle body reinforcing structure of claim 1, wherein foam is filled into a space between the outer plate of each of the at least two side sills and the outer partition.

11. The side vehicle body reinforcing structure of claim 1, wherein foam is filled into at least one among three spaces partitioned by dividing the interior space by the outer partition and the center partition.

12. The side vehicle body reinforcing structure of claim 1, wherein foam is respectively filled into a space between the outer plate of each of the at least two side sills and the outer partition and a space between the inner plate of each of the at least two side sills and the center partition.

13. The side vehicle body reinforcing structure of claim 1, wherein the outer partition includes a portion which has a "U" shape to be convex toward the outer plate of each of the at least two side sills.

14. The side vehicle body reinforcing structure of claim 1, wherein each of the at least two side sills has a first load absorbing section for firstly absorbing load during a collision of a side vehicle body,
   wherein the first load absorbing section is a portion of each of the at least two side sills from the outer plate of each of the at least two side sills to the outer partition.

15. The side vehicle body reinforcing structure of claim 14, wherein each of the at least two side sills has a second load absorbing section for secondly absorbing load during the collision of the side vehicle body transferred via the first load absorbing section,
   wherein the second load absorbing section is a portion of each of the at least two side sills from the center partition to the inner plate of each of the at least two side sills.

16. The side vehicle body reinforcing structure of claim 15, wherein the center floor panel and the seat cross member thirdly absorb load during the collision of the side vehicle body that is transferred via the second load absorbing section.

17. The side vehicle body reinforcing structure of claim 1, further comprising an inner partition spaced apart from the inner plate of each of the at least two side sills toward the outer plate of each of the at least two side sills in the interior space and connecting an upper plate of each of the at least two side sills with a lower plate of each of the at least two side sills,
   wherein foam is filled into a space between the inner plate of each of the at least two side sills and the inner partition, and the center partition is supported by the inner plate of each of the at least two side sills by being supported by the inner partition.

18. The side vehicle body reinforcing structure of claim 17, wherein the inner partition extends from a front end of each of the at least two side sills to a rear end of each of the at least t:iNo side sills.

19. The side vehicle body reinforcing structure of claim 17, wherein the inner partition comprises:
   a pair of third contacting portions respectively contacting a bottom side of the upper plate of each of the at least two side sills and a top side of the lower plate of each of the at least two side sills;
   a pair of third vertically extended portions bent from the respective pair of third contacting portions and respectively extending upwardly and downwardly;
   a pair of third horizontally extended portions bent from the respective the pair of third vertically extended portions and extending toward the outside in the width direction of the vehicle body; and
   a third connecting portion connecting the pair of third horizontally extended portions.

20. The side vehicle body reinforcing structure of claim 17, further comprising an outer partition spaced apart from the outer plate of each of the at least two side sills toward the inner plate of each of the at least two side sills and spaced apart from the center partition toward the outer plate of each of the at least two side sills in the interior space, wherein the outer partition connecting the upper plate of each of the at least two side sills with the lower plate of each of the at least two side sills.

21. The side vehicle body reinforcing structure of claim 20, wherein foam is filled into a space between the outer plate of each of the at least two side sills and the outer partition among four spaces divided by partitioning the interior space by the outer partition, the center partition, and the inner partition too.

22. The side vehicle body reinforcing structure of claim 20, wherein foam is filled into at least two spaces including a space between the inner plate of each of the at least two side sills and the inner partition among four spaces divided by partitioning the interior space by the outer partition, the center partition, and the inner partition.

23. The side vehicle body reinforcing structure of claim 1, wherein the seat cross member has a section having a "U" shape to be upwardly convex.

24. The side vehicle body reinforcing structure of claim 23, wherein foam is filled into a space surrounded by the seat cross member and the center floor panel.

25. The side vehicle body reinforcing structure of claim 23, further comprising a reinforcing portion disposed between the seat cross member and the center floor panel, wherein the reinforcing portion has a bottom side connected with a bottom side of the seat cross member and connected to the center floor panel, and has a section of a "U" shape to be upwardly convex.

26. The side vehicle body reinforcing structure of claim 25, wherein foam is filled into at least one of a space enclosed by the reinforcing portion and the seat cross member or a space enclosed by the reinforcing portion and the center floor panel.

27. The side vehicle body reinforcing structure of claim 25, wherein the reinforcing portion extends from one end of the seat cross member to another end the seat cross member in the width direction of the vehicle body.

28. The side vehicle body reinforcing structure of claim 25, wherein the reinforcing portion is spaced apart from the seat cross member, and foam is filled into a space enclosed by the reinforcing portion and the seat cross member.

29. The side vehicle body reinforcing structure of claim 25, wherein the reinforcing portion has a stop side contacting the seat cross member, and foam is filled into a space enclosed by the reinforcing portion and the center floor panel.

* * * * *